US006852829B2

(12) United States Patent
Buijs

(10) Patent No.: US 6,852,829 B2
(45) Date of Patent: Feb. 8, 2005

(54) PROCESS FOR THE SIMULTANEOUS PREPARATION OF POLYAMIDES WITH AT LEAST TWO DIFFERENT VISCOSITIES

(75) Inventor: Wim Buijs, Schinnen (NL)

(73) Assignee: DSM N.V., Heerlen (NL)

( * ) Notice: Subject to any disclaimer, the term of this patent is extended or adjusted under 35 U.S.C. 154(b) by 12 days.

(21) Appl. No.: 10/258,116

(22) PCT Filed: Apr. 17, 2001

(86) PCT No.: PCT/NL01/00303

§ 371 (c)(1),
(2), (4) Date: Oct. 21, 2002

(87) PCT Pub. No.: WO01/81452

PCT Pub. Date: Nov. 1, 2001

(65) Prior Publication Data

US 2003/0109645 A1 Jun. 12, 2003

(30) Foreign Application Priority Data

Apr. 21, 2000 (EP) .............................. 00201422

(51) Int. Cl.$^7$ .............................................. C08L 77/00
(52) U.S. Cl. ....................... 528/323; 525/432; 528/310; 528/312
(58) Field of Search .......................... 525/432; 528/310, 528/312, 323

(56) References Cited

U.S. PATENT DOCUMENTS

| | | | |
|---|---|---|---|
| 2,562,796 A | 8/1951 | Koch | |
| 4,433,116 A | * 2/1984 | Largman et al. | ............ 525/420 |
| 4,540,774 A | 9/1985 | Gerking et al. | |
| 4,963,650 A | 10/1990 | Bokareva et al. | |
| 5,681,952 A | 10/1997 | Sifniades et al. | |
| 5,696,227 A | 12/1997 | Mumcu | |

FOREIGN PATENT DOCUMENTS

| | | |
|---|---|---|
| GB | 923137 | 3/1961 |
| WO | 00/23501 | 10/1999 |
| WO | 00/23502 | 10/1999 |

OTHER PUBLICATIONS

Derwent Publications English Abstract of JP 57 053532, Mar. 30, 1982, AN 1982–36489E.

* cited by examiner

*Primary Examiner*—Ana Woodward
(74) *Attorney, Agent, or Firm*—Mayer, Brown, Rowe & Maw LLP

(57) ABSTRACT

A process for the simultaneous preparation of polyamide-6 with at least two different viscosities comprising prepolymerisation of ε-caprolactam and/or other polyamide-6 precursors in the presence of water, wherein at least part of the necessary water is supplied to the prepolymerisation via the gas phase and the obtained prepolymer is progressively moved and treated with an inert gas in at least two condensation reaction zones or reactors, placed in series, and the prepolymerisation and condensation are carried out in reactor(s) or reaction zones having a self-renewing interface between molten phase and gas phase with a large surface/volume ratio of the molten phase and the molten phase is relatively strong mixed.

12 Claims, No Drawings

PROCESS FOR THE SIMULTANEOUS PREPARATION OF POLYAMIDES WITH AT LEAST TWO DIFFERENT VISCOSITIES

CROSS REFERENCE TO RELATED APPLICATIONS

This application is the National Phase of International Application PCT/NL01/00303 filed Apr. 17, 2001, which designated the U.S., and which is hereby Incorporated in its entirety by reference.

The invention relates to a process for the simultaneous preparation of polyamide-6 with at least two different viscosities comprising prepolymerisation of ε-caprolactam and/or other polyamide-6 precursors in the presence of water.

JP-A-57053532 discloses a device for simultaneously producing polyamide-6 with different viscosities. The device consists of a prepolymerisation tower in which ε-caprolactam is converted with water at a temperature of 200–300° C. into a prepolymer and the prepolymer is fed to at least two condensation towers, placed in parallel, in which the prepolymer is further polymerised at a temperature of 230–300° C. and the viscosity of the obtained polymer is varied by varying the quantity of added viscosity stabilizer and/or by varying the removed quantity of water.

A disadvantage of producing polyamide-6 with different viscosities in such a device is that long overall residence times are required because for each desired viscosity of polyamide-6 a separate condensation tower is needed. The need for separate condensation towers, i.e. extra process equipment and thus extra investments, makes this process unattractive when performed on a large and commercial scale.

The object of the invention is a process for simultaneously preparing polyamide-6 with different viscosities for which shorter overall residence times are needed This object is achieved in that at least part of the necessary water is supplied to the prepolymerisation via the gas phase and the obtained prepolymer is progressively moved and treated with an inert gas in at least two condensation reaction zones or reactors, placed in series, and the prepolymerisation and condensation are carried out in reactor(s) or reaction zones having a self-renewing interface between molten phase and gas phase with a large surface/volume ratio of the molten phase and the molten phase is relatively strong mixed.

It has been found that with the process according to the invention polyamide-6 with different viscosities can simultaneously be prepared with a total residence time in the reactor or reaction zones which is significantly lower than in the process as disclosed in JP-A-57053532. This is advantageous because less process equipment is necessary for obtaining comparable amounts of polyamide-6. Another advantage of the process according to the invention is that there is a great flexibility in the production of polyamide-6 with different grades. Still another advantage of the process according to the invention is that solid-phase post condensation is not necessary for obtaining high molecular weight polyamide-6 having a relative viscosity, measured in formic acid, higher than the relative viscosity of polyamide-6 obtained in accordance with the conventional VK-method (VK=Vereinfacht Kontinuerlich). In general, the polyamide-6 obtained with the VK-method has a relative viscosity $\eta_{rel}$, measured in formic acid, of between 2.0–2.8 after a residence time of between 10–20 hours. The relative viscosity is an indication for the degree of polymerisation. If polyamide-6 having a higher degree of polymerisation than polyamide-6 obtained with the VK-method is required, a solid-phase post condensation is employed afterwards. This solid-phase post condensation process generally requires at least 12 hours.

With polyamide-6 precursors is meant 6-aminocaproic acid, 6-aminocaproic amide, 6-aminocaproate ester, oligomers of these compounds and/or polymers of these compounds.

6-Aminocaproic acid, 6-aminocaproate ester, 6-aminocaproamide, oligomers of these compounds and/or polymers of these compounds can be obtained by various processes. For example in U.S. Pat. No. 4,730,040 a process is described in which an aqueous mixture is obtained containing 6-aminocaproic acid and some ε-caprolactam starting from 5-formylvalerate ester. Further in EP-A-729943 a process is described in which an aqueous mixture is obtained containing 6-aminocaproic acid, 6-aminocaproamide and ε-caprolactam also starting from a 5-formylvalerate ester.

U.S. Pat. No. 5,068,398 describes a process in which an aqueous mixture is obtained containing 6-aminocaproate ester and some ε-caprolactam starting from a 5-formylvalerate ester.

Other examples of polyamide-6 precursors, which can be used in the process according to the invention, are polyamide-6 processing waste, polyamide-6 carpet waste and/or polyamide-6 extraction wash water.

The ε-caprolactam and/or the polyamide-6 precursors, which are obtainable by the above-described processes, are preferably brought in the prepolymerisation reactor or reaction zone as a liquid, for example as a melt.

As used herein, the term water in the gas phase is preferably superheated steam. If no statement is made to the contrary, all references to steam shall mean superheated steam in the description.

With prepolymerisation is meant ring opening of at least a part of the ε-caprolactam, under the influence of water, to the corresponding 6-aminocaproic acid and subsequently polymerisation of 6-aminocaproic acid into a prepolymer of ε-caprolactam. This prepolymer essentially consists of low molecular weight polyamide-6 having a relative viscosity $\eta_{rel}$ about 1.2–1.6 as measured in formic acid.

In case of the process of the invention is carried out starting with 6-aminocaproic acid or mixtures of 6-aminocaproic acid and other polyamide-6 precursors, the prepolymerisation can be carried out in the absence of any water.

In the condensation stage, the prepolymer is further polymerised by polycondensation and polyaddition to a polyamide-6 having a relative viscosity of between 1.6 and 6.0 as measured in formic acid. Polyamide-6 with a relative viscosity of between 1.6 and 6.0 as measured in formic acid can be used for the production of filaments, fibers and engineering plastics.

The process of the invention is carried out in one reactor or in several reactors in series. According to one embodiment, the prepolymerisation is carried out in one reactor, the condensation is carried out in a separate reactor, placed in series with the previous reactor. The condensation is preferably carried out in different reaction zones, of which the number corresponds with the number of polymers with different viscosities. In another and preferred embodiment, all reactions are carried out in one reactor with different reaction zones for the prepolymerisation and the condensation. It has been found that all stages of the process of the invention can advantageously be performed at constant temperature and pressure. This is advantageous because due to the fact that temperature and pressure can be kept constant in all stages of the polymerisation, the process of the invention can be carried out in one reactor. In this preferred embodiment, the condensation is preferably carried out in different reaction zones, of which the number corresponds with the number of polymers with different viscosities.

In the process according to the invention, the prepolymerisation and the condensation are carried out in reactor(s) or reactor zones provided with means by which a self-renewing interface between the molten phase and the gas phase is effected with a large surface/volume ratio of the molten phase and by which the molten phase is relatively strong mixed. For example, the surface/volume ratio of the molten phase is 5 $m^{-1}$, preferably greater than 10 $m^{-1}$, more preferably 40 $m^{-1}$, most preferably greater than 100 $m^{-1}$. The volume ratio molten phase/gas phase is generally less than 1, preferably less than 0.5, more preferably less than 0.2.

Reactors that have means by which a self-renewing interface between the molten phase and the gas phase is effected and in which relatively strong mixing of the molten phase can be achieved are known per se and inter alia comprise horizontal scraped-surface reactors. With relatively strong mixing is meant mixing such that the molten phase is intensively kneaded and a large gas volume is present having a relatively high partial pressure of the water vapour. Moreover, it has been found that a thin layer, of which the composition is constantly renewed by shear forces, as is the case in scraped-surface reactors, is most preferred. Examples of such scraped-surface reactors are described, inter alia, in DE-A-4126425 and BE-A-649023. Found to be particularly suitable was a reactor of the turbulent-mixer type, in which axial and radial mass transfer is promoted by stirring paddles that at the same time are provided with scrapers by means of which the product is smeared over the entire internal surface of the horizontal reactor vessel. Such a type of reactor is commercially available up to a total capacity of 50,000 liters, for example from Drais, Mannheim, De.

At least a part, but preferably all, of the necessary water for the prepolymerisation is supplied via the gas phase to the reactor mass. Preferably, the starting mixture is first heated to the temperature of the prepolymerisation and subsequently the water is supplied to the reactor mass. Heating the starting mixture to the temperature of the prepolymerisation may be carried out in a separate vessel or in the reactor in which the prepolymerisation is carried out. The amount of steam that is present and/or introduced in the prepolymerisation reactor/reaction zone in the gas phase is preferably between 50 and 100 wt. %. This yields an amount of water in the melt between 0.1 and 5.0 wt. %.

The prepolymerisation is preferably carried out at a temperature of between about 220 and 290° C., more preferably at a temperature of between about 260 to 280° C.

The pressure of the prepolymerisation is generally between 0 and 5 MPa, preferably between 0 and 2 MPa and more preferably between 0.1 and 1 MPa. The atmosphere above the melt is generally a mixture of an inert gas and steam. Oxygen must be excluded as far as possible to prevent discoloration of the polyamide.

The residence time in the prepolymerisation reactor or reaction zone can be varied between 0 and 60 minutes and depends essentially on the applied temperature and pressure. Preferably, the residence time is between 10 and 45 minutes.

The water in the gas atmosphere can be supplemented, for example, by recirculation of the gas phase, water consumed outside the reactor (zone) being supplemented, or by injection of superheated steam into the reactor (zone). The first method is preferable. The second method has the additional drawback that the energy required for the evaporation of the water must be supplied by means of relatively costly facilities in the reactor (zone).

The prepolymer obtained in the prepolymerisation reactor or reaction zone is further polymerised in at least two reaction zones or reactors placed in series.

The obtained prepolymer is progressively moved and treated with an inert gas in at least two reaction zones or reactors, placed in series. The prepolymer with low relative viscosity is fed into the first reactor or reaction zone and subjected to mixing while a stream of inert gas is drawn through the reactor. In this way, water is continuously removed from the reaction mass very quickly, such that polyamide-6 with the first desired relative viscosity can be obtained very quickly. A part of the polyamide-6 with the first desired relative viscosity is separated. The remaining polyamide-6 with the first desired relative viscosity is subsequently moved into the second reactor or reaction zone and subjected to mixing while a stream of inert gas is drawn through the reactor. In this way, water is continuously removed from the reaction mass very quickly, such that polyamide-6 with the second desired relative viscosity can be obtained very quickly.

It has been found that with the process of the invention polyamide-6 with different relative viscosities can be obtained in a very simple way by mainly varying the amount of superheated steam in inert gas (wt. %) while maintaining the total pressure (water and inert gas pressure) constant. The residence time co-determines the obtained relative viscosity. The amount of superheated steam in inert gas (wt. %) in the condensation can vary between 0 and 10 wt. %.

It has surprisingly been found that the polyamides-6 obtainable with the process according to the invention has a cyclic dimmer concentration and/or ε-caprolactam concentration that is remarkable lower than with conventional prior art processes for preparing polyamide-6. The polyamides-6 obtainable with the process according to the invention contains less than 11 wt. %, preferably less than 7 wt. % ε-caprolactam and/or contains less than 0.6 wt. %, preferably less than 0.2 wt. % cyclic dimmer. A low level of ε-caprolactam and/or cyclic dimmer in the polyamide-6 is advantageous because a reduced extraction capacity to remove them from the polyamide-6 is sufficient.

In one embodiment of the invention, a prepolymer having a relative viscosity of between 1.2. and 1.6 (as measured in formic acid) is fed to a first condensation reactor or reaction zone to which inert gas is supplied in an amount such that the amount of steam in the inert gas (wt. %) is between 0 and 10 wt. %. The polyamide-6 obtained at the end of this first reaction zone or condensation reactor, placed in series, has a relative viscosity of between 1.6 and 6.0 as measured in formic acid.

A part of the polyamide-6 obtained at the end of the first condensation reactor or reaction zone is subsequently fed to a second condensation reactor or reaction zone, placed in series, in which the amount of steam in the inert gas (wt. %) is between 0 and 10 wt. %. The polyamide-6 obtained at the end of this second condensation reactor or reaction zone has a relative viscosity of between 1.6 and 6.0 as measured in formic acid.

Examples of the inert gas are $N_2$ and $CO_2$. A preferred inert gas is $N_2$-gas.

The temperature in the condensation is generally between 220 and 290° C., preferably between 260 to 280° C.

The pressure of the condensation is generally between 0 and 5 MPa, preferably between 0 and 2 MPa and more preferably between 0.1 and 1 MPa.

The residence time in the condensation reactor(s) or reaction zone(s), placed in series, can be varied between 0 and 360 minutes. At a certain amount of superheated steam in inert gas and at a certain pressure and temperature, the residence time determines the relative viscosity of the polyamide-6.

The invention also relates to a process for the simultaneous preparation of ε-caprolactam and at least one polyamide-6 of a certain viscosity comprising prepolymerisation of ε-caprolactam and/or other polyamide-6 precursors in the presence of water, wherein at least part of the necessary water is supplied to the prepolymerisation via the gas phase, the obtained prepolymer is progressively moved and treated with an inert gas in at least one condensation reaction zone or reactor. The obtained polyamide-6 or a part of the obtained polyamide-6 is progressively moved and treated with superheated steam in a depolymerisation reactor or reaction zone, and the prepolymerisation, condensation and depolymerisation are carried out in reaction zones or reactor(s), placed in series, having a self-renewing interface between molten phase and gas phase with a large surface/volume ratio of the molten phase and the molten phase is relatively strong mixed.

In this embodiment of the invention, the prepolymerisation can be performed as described above. The condensation can be carried out in one or more reaction zone(s) or reactor(s), placed in series. In case one wants to prepare polyamide-6 with different viscosities, the condensation is preferably carried out in more than one reaction zone(s) or reactor(s), placed in series, and the amount of superheated steam in inert gas differs in the different reactors/reaction zones while the total pressure (water and inert gas pressure) can be kept constant.

This embodiment of the invention is carried out in one reactor or in several reactors in series. Preferably, the prepolymerisation, the condensation and the depolymerisation are carried out in one reactor with different reaction zones for the prepolymerisation, the condensation and the depolymerisation.

The depolymerisation is carried out in the presence of superheated steam. At least a part of the necessary water for the depolymerisation is supplied via the gas phase to the reactor mass. The amount of water, which is present and/or introduced in the depolymerisation reactor/reaction zone, is generally such that the superheated steam/reaction mixture ratio (in weight) is preferably between 1 and 20. The reaction mixture is the total weight of the mixture that is fed into the depolymerisation reactor (zone). It has been found that with the process according to the invention the amount of ε-caprolactam obtained in the depolymerisation reactor or reaction zone can be varied by mainly varying the amount of superheated steam. Part of the superheated steam can be substituted with an inert gas, for example nitrogen. The amount of superheated steam in inert gas is preferably higher than 50 wt. %.

The temperature in the depolymerisation is generally between 250 and 400° C. and preferably between 270 and 350° C. The depolymerisation is preferably performed at a temperature higher than the prepolymerisation and condensation.

The pressure of the depolymerisation is generally between 0.1 and 10 MPa, preferably between 0.1 and 2 MPa. The depolymerisation is preferably performed at a pressure equal to the pressure of the prepolymerisation and condensation.

In this embodiment of the invention, the gas phase obtained in the depolymerisation will comprise steam and v-caprolactam. The ε-caprolactam can be isolated from this gaseous stream obtained in this embodiment of the invention by normal methods known to one skilled in the art, for example as described in U.S. Pat. No. 3,658,810. Preferably ε-caprolactam is isolated by partial condensation in which a liquid aqueous phase containing ε-caprolactam and water and a gaseous phase containing steam is obtained. The steam can be reused in the process according to the invention, for example by first passing steam via a heat exchanger.

The process of the present invention is preferably performed as a continuous process in which superheated steam, inert gas and starting compounds are continuously fed to and product is continuously discharged from for example a Drais reactor. The continuously operated process according to the invention can be practiced in a reactor apparatus which is provided with an inlet for the starting material, means for supplying steam and inert gas such that the steam and the inert gas are contacted with the reaction mass and an outlet for the steam, inert gas, polyamide-6 and optionally ε-caprolactam.

The invention will be elucidated with the following non-limiting examples.

EXAMPLE I

A 100 l DRAIS TR 100 test reactor (a horizontal tubular reactor equipped with a rotating axis on which mixing and scraping devices are mounted) fitted with a gas inlet and outlet and a pressure controller, was filled with 25 kg of ε-caprolactam and melted under a nitrogen gas stream. The reactor was heated to 275° C. at a pressure of 0.5 MPa. Subsequently, 10 kg/h of superheated steam (temperature of 275° C.) was supplied to the reactor for 30 minutes, maintaining a pressure of 0.5 MPa. The resulting off gas was lead into a vessel containing about 500 l of water. After 30 minutes the steam flow was replaced by a nitrogen flow of about 20 kg/h for 70 minutes. A Polyamide sample was taken by partially discharging the reactor in cold water. The polyamide sample obtained after a total residence time in the reactor of 100 minutes (Σtime) was assayed in terms of relative viscosity (as determined in formic acid), and the level of ε-caprolactam (CL) and cyclic dimmer (CD), see Table. The nitrogen flow of about 20 kg/h was supplied to the reactor for another 100 minutes. A second sample (Σtime=200 minutes) was taken and assayed (see Table).

EXAMPLE II

A 100 l DRAIS TR 100 test reactor as described in Example I was filled with 30 kg of 6-aminocaproic acid and melted under a nitrogen gas stream. The reactor was heated to 275° C. at a pressure of 0.5 MPa. Subsequently, 20 kg/h of a steam/nitrogen flow containing 0.3 wt % of steam (temperature of 275° C.) was supplied to the reactor for 60 minutes, maintaining a pressure of 0.5 MPa. Polyamide samples were taken and assayed as described in Example I. A first polyamide sample was taken after a total residence time of 60 minutes (Σtime=60 minutes). Subsequently, the reaction conditions in the reactor were changed by supplying a steam/nitrogen flow of about 20 kg/h containing 1.8 wt % of steam for 30 minutes (time). A second sample (Σtime=90 minutes) was taken and assayed (see Table). A third sample was taken and assayed after another 30 minutes reaction time during which a steam/nitrogen flow of about 20 kg/h containing 0.3 wt % of steam was supplied (Σtime=120 minutes) (see Table).

EXAMPLE III

Example I was repeated with the exception that the temperature was raised to 300° C. after 210 min. Then the off gas was lead into a cooler, which operated with water of about 65° C. A sample of the resulting condensate contained 12.1 w % of ε-caprolactam. Samples were taken from the reactor and assayed as described above after total residence times of 90, 210 and 270 minutes (see Table).

In all experiments the reactor agitator, consisting of a central shaft with 4 arms at fixed distances at an angle of 90°, was used at a constant speed of 20 revolutions per minute.

Each arm of the agitator is provided with a specially shaped paddle that enables mixing of the reaction mixture by shear with the reactor wall. By smearing the reaction mixture out over the surface of the wall, a high surface renewal was obtained.

TABLE 1

Process conditions and analytical results of examples I–III

| Example | $H_2O$ in steam/ nitrogen flow (wt. %) | time (min.) | Σtime (min.) | Rel. visc. | CL (wt. %) | CD (wt. %) |
|---|---|---|---|---|---|---|
| I | 100.0 | 30 | 30 | — | — | — |
|   | 0.0 | 70 | 100 | 2.67 | 6.31 | 0.32 |
|   | 0.0 | 200 | 300 | 4.02 | 2.62 | 0.46 |
| II | 0.3 | 60 | 60 | 2.64 | 8.14 | 0.22 |
|   | 1.8 | 30 | 90 | 2.64 | 6.39 | 0.23 |
|   | 0.3 | 30 | 120 | 3.03 | 5.71 | 0.30 |
| III | 100.0 | 60 | 60 | — | — | — |
|   | 0.0 | 60 | 90 | 2.57 | 8.14 | 0.16 |
|   | 0.0 | 120 | 210 | 3.52 | 2.81 | 0.58 |
|   | 100.0 | 60 | 270 | 1.52 | 10.68 | 0.22 |

These examples show that the method according to the invention yields polyamides of different viscosities as a function of process conditions in very short residence times. Example II shows in addition that alternatively the viscosity can be easily maintained at a certain desired level by adjusting the steam/nitrogen ratio. This is an important process control strategy. Furthermore example III shows that, if desired, the obtained polyamide also can be depolymerised back to ε-caprolactam in a short time.

It will be evident to those skilled in the art that these batch experiments can be easily transformed into a continuous process, consisting of a single reactor with different zones. It is sufficient to separate the different gas phases of the zones by means of simple plates, since the whole process operates at constant pressure.

What is claimed is:

1. A process for the simultaneous preparation of polyamide-6 with at least two different viscosities in different reaction zones in a single reactor or in at least two reactors or reaction zones placed in series, comprising prepolymerising molten ε-caprolactam and/or other polyamide-6 precursors in the presence of water, wherein at least part of the necessary water is supplied to the prepolymerisation via the a gas phase in contact with molten phase; sequentially condensing-polymerizing the obtained prepolymer in the presence of inert gas in at least two condensation reaction zones or reactors, placed in series, wherein the reaction conditions are varied in the different reaction zones or reactor thereby obtaining polyamide-6 with different viscosities wherein the different viscosities are relative viscosities above 1.6, and the prepolymerisation and condensation reactions are carried out in said reactor(s) or reaction zones having a molten phase with a large surface/volume ratio and wherein the molten phase is relatively strongly mixed to renew the interface between the molten phase and the gas phase.

2. A process according to claim 1, wherein the prepolymerisation and the condensation arc carried out in one reactor having different reaction zones.

3. Process according to claim 1, wherein the prepolymerization is carried out in the presence of superheated steam yielding 0.1 to 5.0 wt % water in the melt.

4. Process according to claim 1, wherein the prepolynicrization is carried out at a temperature of about 260 and 280° C.

5. Process according to claim 1, wherein the inert uas comprises superheated steam and wherein the reaction conditions are varied by varving the amount of superheated steam in said inert gas (wt. %) and/or by varying the residence time.

6. Process according to claim 5, wherein the amount of superheated steam in inert gas (wt. %) in the condensation varies between 0 and 10 wt. %.

7. Process according to claim 1, wherein the condensation is carried out in two reaction zones or reactors placed in series.

8. Process according to claim 1, wherein the surface/volume ratio of the molten phase is greater than 10 m$^{-1}$.

9. Process according to claim 8 wherein the surface/volume ratio of the molten phase is greater than 40 m$^{-1}$.

10. Process according to claim 1 wherein the reactor is a horizontal scraped-surface reactor.

11. A process for the simultaneous preparation of ε-caprolactam and at least one polyamide-6 of a certain viscosity comprising prepolymerising ε-caprolavtaxn and/or other polyamide-6 precursors in the presence of water, wherein at least part of the necessary water is supplied to the prepolymerisation via a gas phase, progressively moving the obtained prepolymer and treating it with an inert gas in at least one condensation reaction zone or reactor, progressively moving and depolymerizing the obtained polyamide-6 or a part of the obtained polyamide-6 and treating it with superheated steam in a depolymerisation reactor or reaction zone to produce ε-caprolactam and wherein the prepolymerisation, condensation and depolymerisation are carried out in reaction zones or reactor(s), placed in series, and wherein the molten phase and has a large surface/volume ratio and further wherein the molten phase is relatively strongly mixed to renew the interface between the molten phase and the gas phase.

12. Process according to claim 11 wherein the inert gas comprises superheated steam and the amount of superheated steam in said inert gas is higher than 50 wt. %.

* * * * *